US008224520B2

(12) United States Patent
Ito

(10) Patent No.: US 8,224,520 B2
(45) Date of Patent: Jul. 17, 2012

(54) FAILURE DETERMINATION APPARATUS FOR VEHICLE, FAILURE DETERMINATION METHOD AND COMPUTER READABLE MEDIUM FOR FAILURE DETERMINATION

(75) Inventor: Masaya Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 499 days.

(21) Appl. No.: 12/585,409

(22) Filed: Sep. 15, 2009

(65) Prior Publication Data

US 2010/0082199 A1 Apr. 1, 2010

(30) Foreign Application Priority Data

Sep. 26, 2008 (JP) ................................ 2008-248018

(51) Int. Cl.

| | |
|---|---|
| ***G01M 17/00*** | (2006.01) |
| ***G06F 7/00*** | (2006.01) |
| ***G06F 19/00*** | (2006.01) |
| ***G06F 11/30*** | (2006.01) |
| ***G07C 5/00*** | (2006.01) |

(52) U.S. Cl. ..................... 701/33.6; 701/29.1; 701/29.4; 701/31.7; 702/182; 702/183; 714/1; 714/799; 714/100

(58) Field of Classification Search ................. 701/29.1, 701/29.4, 29.6, 31.4, 31.5, 31.7, 31.9, 32.1, 701/33.1, 33.6; 702/182–188; 714/1, 100, 714/25, 701, 799; 700/21, 26, 27, 79
See application file for complete search history.

(56) References Cited

U.S. PATENT DOCUMENTS

| | | | | |
|---|---|---|---|---|
| 5,696,676 | A | 12/1997 | Takaba | |
| 6,442,458 | B2 * | 8/2002 | Kubo et al. | 701/34.4 |
| 6,502,021 | B2 * | 12/2002 | Wada et al. | 701/33.4 |
| 7,869,917 | B2 | 1/2011 | Morozumi | |
| 8,078,355 | B2 * | 12/2011 | Nakagaki | 701/31.8 |
| 8,095,257 | B2 * | 1/2012 | Kondoh et al. | 701/31.4 |

FOREIGN PATENT DOCUMENTS

| | | |
|---|---|---|
| JP | A-02-110337 | 4/1990 |
| JP | A-10-297446 | 11/1998 |
| JP | A-2002-001921 | 1/2002 |
| JP | A-2005-195501 | 7/2005 |
| JP | A-2008-37194 | 2/2008 |
| JP | A-2008-195130 | 8/2008 |

* cited by examiner

*Primary Examiner* — Hussein Elchanti
*Assistant Examiner* — Rami Khatib
(74) *Attorney, Agent, or Firm* — Posz Law Group, PLC

(57) ABSTRACT

A failure determination apparatus for a vehicle includes: a failure determination element configured to determine that failure occurs at the vehicle when a state with failure detection continues for a first period, and to determine that the failure is resolved when a state without the failure detection continues for a second period; a notification element configured to notify failure information to an external device when the failure determination element determines that the failure occurs at the vehicle; a repair completion detection element configured to detect completion of repair of the vehicle with respect to the failure; and a short-cut element configured to shorten the second period when the repair completion detection element detects the completion of repair of the vehicle.

5 Claims, 4 Drawing Sheets

FAILURE DETERMINATION APPARATUS FOR VEHICLE, FAILURE DETERMINATION METHOD AND COMPUTER READABLE MEDIUM FOR FAILURE DETERMINATION

CROSS REFERENCE TO RELATED APPLICATION

This application is based on Japanese Patent Application No. 2008-248018 filed on Sep. 26, 2008, the disclosure of which is incorporated herein by reference.

FIELD OF THE INVENTION

The present invention relates to a failure determination apparatus for a vehicle, a failure determination method and a computer readable medium for failure determination.

BACKGROUND OF THE INVENTION

Conventionally, when anomaly occurs at a vehicle, information about the anomaly is transmitted from the vehicle to an external information center automatically. For example, in an information service system disclosed in JP-A-H10-297446, a communication ECU mounted on the vehicle periodically communicates with other ECU so that the communication ECU monitors function of the other ECU. When the other ECU does not function normally, the communication ECU transmits a data to the information service center. Thus, the information service center can specify function at which the anomaly occurs. Further, the center partially or fully carries out the function for the other ECU.

When the ECU detects the anomaly of the vehicle, a chattering may occur so that a case where the anomaly is detected and a case where the anomaly is not detected are alternately switched at frequent intervals. For example, when anomaly is detected based on a liquid level of oil or window washer fluid, a state in which the anomaly is not detected may be switched to a state in which the anomaly is temporally detected, or a state in which the anomaly is detected may be switched to a state in which the anomaly is not temporally detected, since a tilt of the vehicle on a sloping road affects the liquid level. Thus, it is not appropriate to determine based on the anomaly detection whether the anomaly actually occurs.

Thus, it is preferable to determine the actual anomaly occurrence when the state, in which the anomaly is detected, continues for a predetermined period. Similarly, it is preferable to determine the anomaly is resolved (i.e., recovered) after the actual anomaly occurrence when the state, in which the anomaly is not detected, continues for a predetermined period.

Here, it is preferred that the predetermined period is set to be longer in view of the influence of the chattering. On the other hand, it is important to notice the anomaly immediately. Accordingly, the period for determining the actual anomaly occurrence is set to be a comparative short time such as 8 seconds. The period for determining the recovery from the anomaly is set to be a comparative long time such as 10 trips. Here, the definition of the trip is a period between a switch on time and a following switch on time.

For example, as shown in FIG. 4A, a failure detection device for a vehicle confirms a detection result that the failure occurs when the device receives the same failure occurrence result continuously for a predetermined period IVA such as 8 seconds. Then, the device notices the failure. After that, the device confirms the detection result that the failure is resolved when the device determines that a state, in which the failure detection is not received, continues for a predetermined period IVB such as 10 trips.

Thus, a dealer for repairing vehicles can preliminary receives failure information of the vehicle from an information center so that the dealer prepares for the repair. The repair of the vehicle can be performed effectively.

However, as shown in FIG. 4B, failure may occur again after an owner of, the vehicle receives the repaired vehicle from the dealer. In this case, the failure may not be informed to the information center. Specifically, the failure may occur again before the device determines that the state, in which the failure detection is not received, continues for the predetermined period IVB. That is, the failure may occur again before the device confirms the resolution of the failure. In this case, the device misjudges that the failure continues.

Thus, it is required to inform the occurrence of anomaly accurately after the vehicle is repaired.

SUMMARY OF THE INVENTION

In view of the above-described problem, it is an object of the present disclosure to provide a failure determination apparatus for a vehicle, a failure determination method and a computer readable medium for failure determination.

According to a first aspect of the present disclosure, a failure determination apparatus for a vehicle includes: a failure determination element configured to determine that failure occurs at the vehicle when a state with failure detection continues for a first period, and to determine that the failure is resolved when a state without the failure detection continues for a second period; a notification element configured to notify failure information to an external device when the failure determination element determines that the failure occurs at the vehicle; a repair completion detection element configured to detect completion of repair of the vehicle with respect to the failure; and a short-cut element configured to shorten the second period when the repair completion detection element detects the completion of repair of the vehicle.

In the above device, even if the failure occurs again after the completion of repair with respect to the failure, the apparatus transmits the failure information to the external device since the second period is shortened when the repair completion detection element detects the completion of repair.

According to a second aspect of the present disclosure, a computer readable medium comprising instructions being executed by a computer, the instructions including a computer-implemented method for determining failure in a vehicle, the instruction includes: an instruction for determining that failure occurs at the vehicle when a state with failure detection continues for a first period, and for determining that the failure is resolved when a state without the failure detection continues for a second period; an instruction for notifying failure information to an external device when failure occurrence is determined; an instruction for detecting completion of repair of the vehicle with respect to the failure; and an instruction for shortening the second period when the completion of repair is detected.

In the above instructions, even if the failure occurs again after the completion of repair with respect to the failure, the failure information is transmitted to the external device since the second period is shortened when the completion of repair is detected.

According to a third aspect of the present disclosure, a method for determining failure in a vehicle includes: determining that failure occurs at the vehicle when a state with failure detection continues for a first period, and determining that the failure is resolved when a state without the failure detection continues for a second period; notifying failure information to an external device when failure occurrence is determined; detecting completion of repair of the vehicle with respect to the failure; and shortening the second period when the completion of repair is detected.

In the above method, even if the failure occurs again after the completion of repair with respect to the failure, the failure information is transmitted to the external device since the second period is shortened when the completion of repair is detected.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
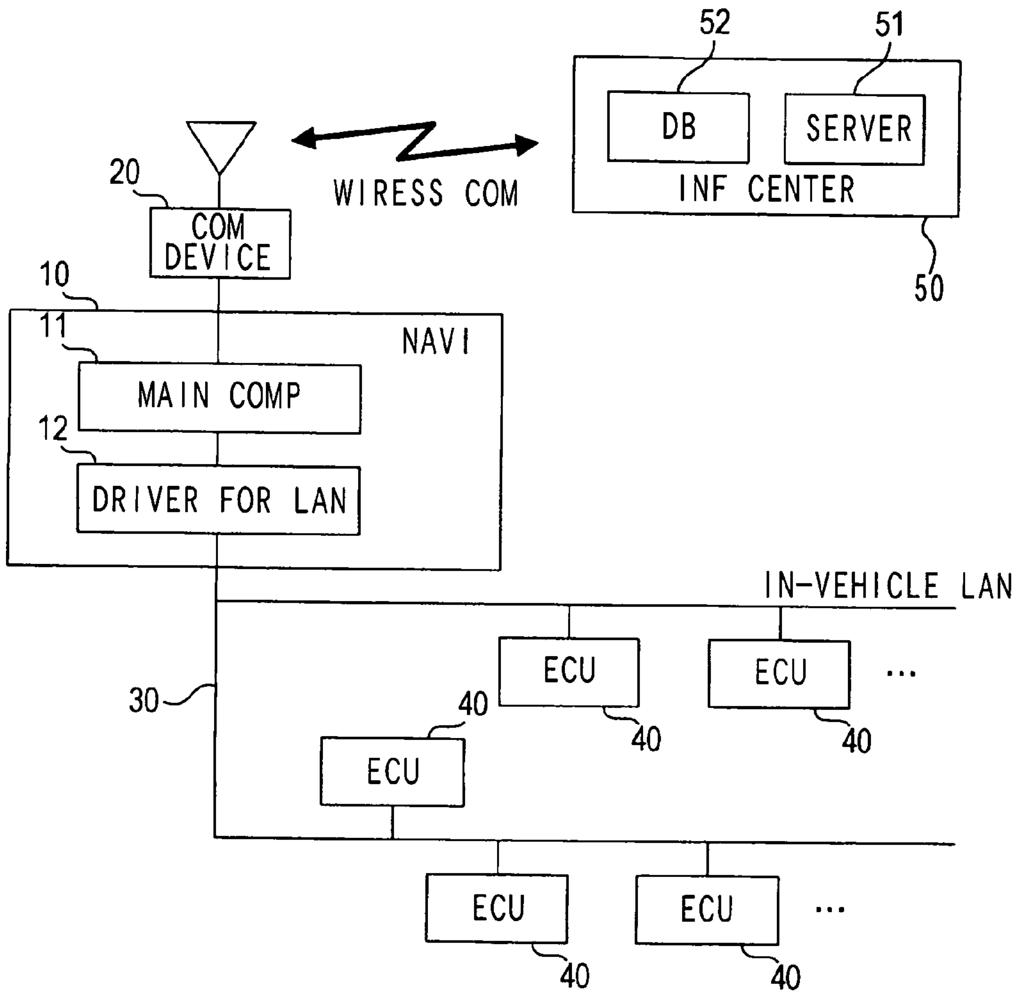
FIG. 1 is a block diagram showing an information service system according to an example embodiment.

FIG. 1 shows an information service system according to an example embodiment.

The system performs that an information service center 50 manages information transmitted from multiple vehicles by air. The center 50 is disposed outside of the vehicles.

Each vehicle utilizing the system includes a navigation device 10 and a communication device 20.

The navigation device 10 includes a main computer 11 and an in-vehicle LAN driver 12. The driver 12 functions as an interface for communicating between ECUS 40, which are coupled with each other via an in-vehicle LAN 30. The main computer 11 communicates with the information service center 50 via the communication device 20. The center 50 is disposed at a distance place.

The center 50 includes a server 51 and a database (DB) storage medium 52 for storing a database. The DB storage medium 52 manages information collected from vehicles.

Next, a process executed by the system will be explained.

Figure 2:
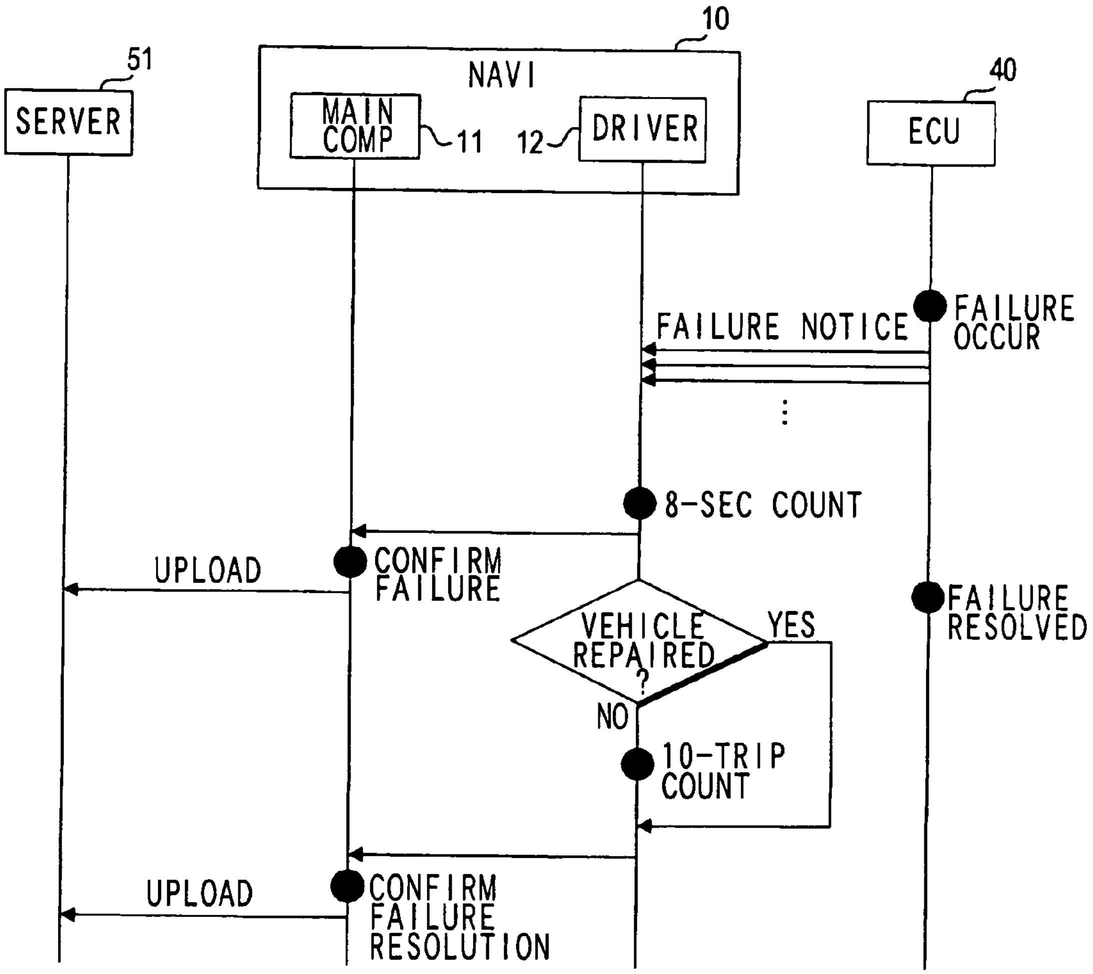
FIG. 2 is a time chart showing a process executed by the system.

As shown in FIG. 2, when failure occurs in a vehicle, the ECU 40 detects the failure. The ECU 40 transmits the failure notice (warning notice) regarding the failure to the navigation device 10. Specifically, for example, the navigation device 10 monitors the information of a warning lamp and the like periodically. When the navigation device 10 detects anomaly based on the information from the warning lamp, the navigation device 10 checks all of the ECUS 40. One of the ECUS 40 corresponding to the failure transmits the failure notice to the device 10.

The navigation device 10 confirms a failure detection result when the device 10 receives the failure notice continuously for a predetermined period such as 8 seconds. The failure detection result shows that the vehicle has the failure. The navigation device 10 transmits (i.e., uploads) the information about the failure detection result to the server 51 in the center 50. Thus, a dealer for repairing vehicles makes an inquiry to the center 50, or the center 50 notifies the failure information to the dealer. The dealer can prepare to repair the vehicle since the dealer preliminary obtains the failure information of the vehicle.

Then, the navigation device 10 confirms a failure resolution result (i.e., failure recovery result) when the device 10 does not receive the failure notice from the ECU 40 continuously for a predetermined period such as 10 trips, i.e., when the device 10 determines that a state, in which the failure notice from the ECU 40 is not transmitted to the device 10, continues for the predetermined period. The failure resolution result shows that the failure in the vehicle is resolved. The device 10 informs (i.e., uploads) the failure resolution information to the server 51. However, when the device 10 determines that the failure in the vehicle is repaired by the dealer before the device 10 confirms the failure resolution result, the device 10 confirms the failure resolution result when the device 10 does not receive the failure notice from the ECU 40 continuously for a shorter period such as 1 trip. Specifically, when the device 10 determines that the failure is repaired before the confirmation of the failure resolution result, the device 10 changes the predetermined period, for example, from 10 trips to 1 trip, and then, the device 10 executes the same process for confirmation of the failure resolution result. Here, the determination of the repair of the vehicle at the dealer is performed based on information from a service tool at a dealer shop, which is connected to the device 10 when the dealer repairs the vehicle.

Figure 3:
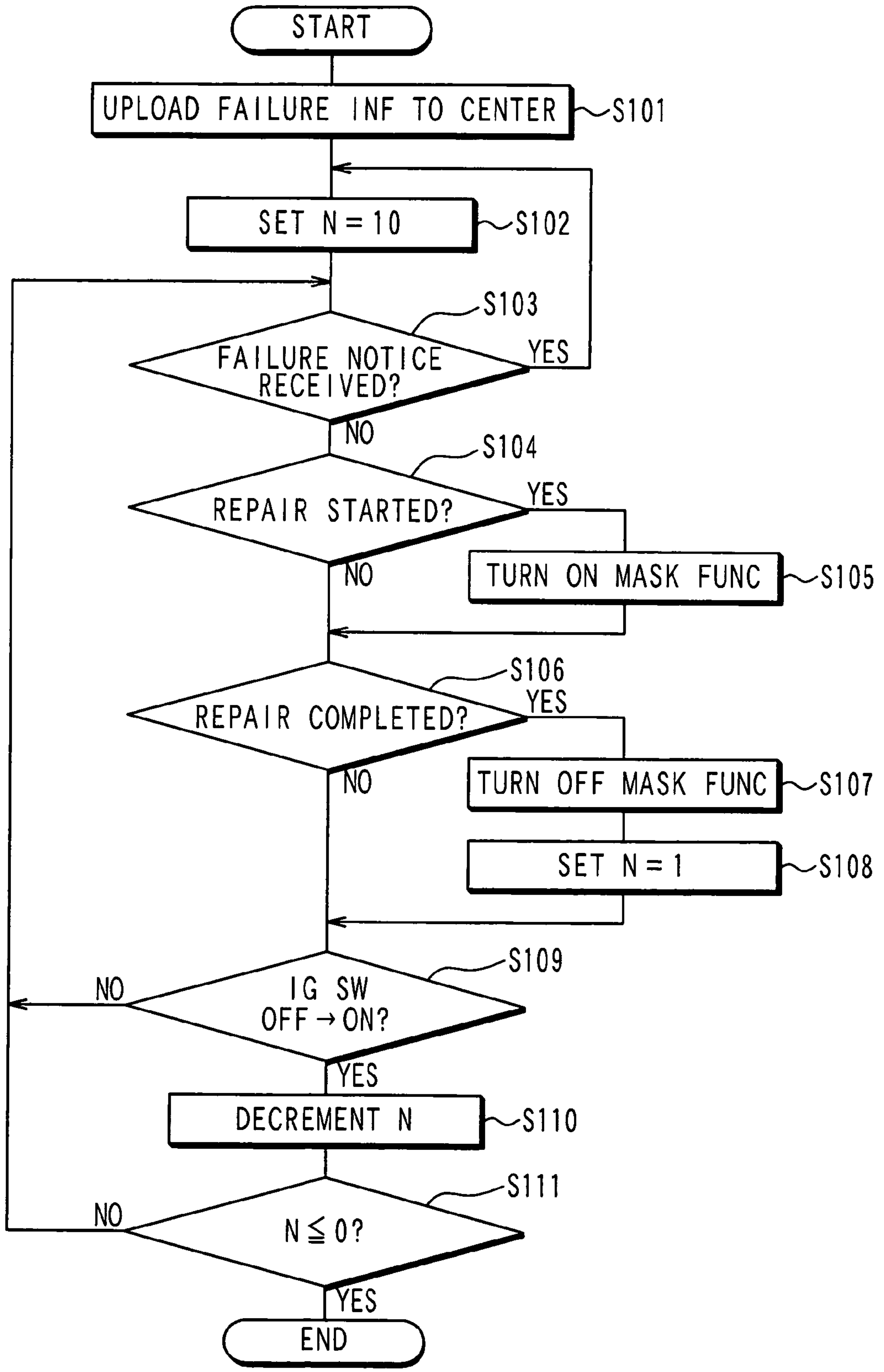
FIG. 3 is a flowchart showing a failure confirmation process.
Figure 4A:
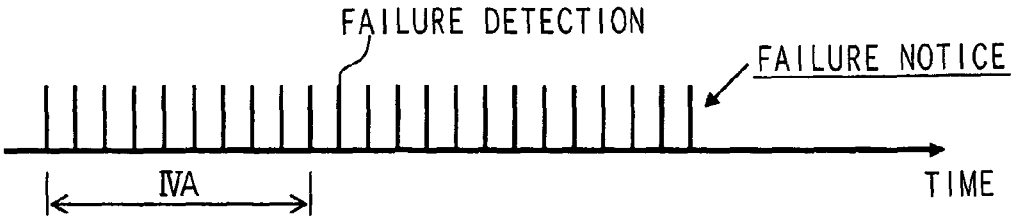
FIG. 4A PRIOR ART
FIG. 4A is a diagram showing a detection method of failure in a vehicle.
Figure 4B:
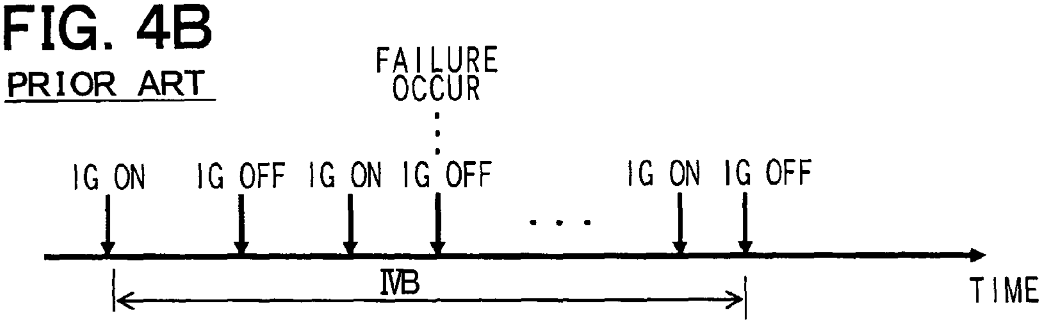
FIG. 4B PRIOR ART
FIG. 4B is a diagram showing a detection method of failure recovery in the vehicle.

The main computer 11 in the navigation device 10 executes a failure confirmation process according to a predetermined program stored in the computer 11. FIG. 3 shows the failure confirmation process. The computer 11 starts to execute the failure confirmation process when the device 10 confirms the failure detection result, i.e., when the device receives the failure notice continuously for 8 seconds.

When the computer 11 starts to execute the process, in Step S101, the computer uploads the confirmed failure information to the server 51.

Then, in Step S102, a N value of a failure resolution counter is set to be 10. The counter detects the number of trips.

In Step S103, the computer 11 determines whether the device 10 receives the failure information about the confirmed failure from the ECU 40.

When the computer 11 determines that the device 10 does not receive the failure notice about the confirmed failure, it goes to Step S104. In Step S104, the computer determines whether the device 10 detects start of vehicle repair at the dealer. Specifically, the computer 11 detects connection to the service tool in the dealer shop as the start of the repair.

When the computer 11 determines that the start of the repair of the vehicle is detected, it goes to Step S105. In Step S105, the computer 11 turns on an upload mask function for the failure information. Then, it proceeds to Step S106. The upload mask function provides to prohibit the upload (i.e., the notice) of the failure information from the device 10 to the server 51. When the computer 11 turns on the upload mask function, the computer 11 does not transmit the failure information to the server 51 even if the device 10 receives a new failure notice from the ECU 40. This is because the device 10 may receive the new failure notice when the service tool for repairing the vehicle checks operation of the vehicle during the repair of the vehicle.

In Step S104, when the computer 11 determines that the start of the repair of the vehicle is not detected, it goes to Step S106.

In Step S106, the computer 11 determines whether the device 10 detects completion of the repair of the vehicle. Specifically, when the device 10 receives a signal showing the completion of the repair from the service tool, the computer 11 determines that the repair completion.

In Step S106, when the computer 11 determines that the device 10 detects the completion of the repair of the vehicle at the dealer shop, it goes to Step S107. In Step S107, the computer 11 turns off the upload mask function. Then, in Step S108, the computer sets the N value of the failure resolution counter to be 1. After that, it goes to Step S109.

In step S106, when the computer 11 determines that the device 10 does not detect the completion of the repair of the vehicle at the dealer shop, it goes to Step S109.

In Step S109, when the computer 11 determines that an ignition switch is not switched from an off-state to an on-state, it returns to Step S103.

In Step S109, when the computer 11 determines that the ignition switch is switched from the off-state to the on-state, it goes to Step S110. In Step S110, the N value of the failure resolution counter is decremented. Specifically, the N value is reduced from one. That means measurement of the number of trips.

In Step S111, the computer 11 determines whether the N value becomes to be equal to or smaller than 0. When the computer 11 determines that the N value is equal to or smaller than 0, it returns to Step S103.

When the computer 11 determines that the device 10 does not receive the failure notice about the confirmed failure, i.e., when the computer 11 determines as "NO" in Step S103, Step S103 to Step S109 are repeated. When the ignition switch is switched from the off-state to the on-state, the computer 11 subtracts one from the N value. Accordingly, while the computer counts 10 trips, i.e., while the N value is larger than 1, Step S103 to Step S109 are repeated.

However, in Step S103, when the computer 11 determines that the device 10 receives the failure notice about the confirmed failure, i.e., when the computer 11 determines as "YES," it returns to Step S102. In step S102, the N value is reset to be 10. Thus, it is necessary to continue the state that the device 10 does not receive the failure notice about the confirmed failure.

In Step S111, when the computer 11 determines that the N value is equal to or smaller than 0, the failure confirmation process ends. Then, the computer 11 confirms the failure resolution result.

In the information service system, the navigation device 10 determines that the failure occurs at the vehicle under a condition that the state of failure detection continues for 8 seconds. After that, the navigation device 10 determines that the failure is resolved under a condition that the state of not detecting the failure continues for 10 trips. When the device 10 detects the completion of the repair of the vehicle with respect to the failure, i.e., when the computer 11 determines as "YES" in Step S106, the computer 11 shortens the number of trips from 10 trips to 1 trip.

The navigation device 10 can prevent from a trouble that the failure information is not transmitted to the server 51 when the failure occurs again after the failure is repaired. Specifically, even if the failure occurs again after the repair of the vehicles, the navigation device 10 transmits the failure information to the server 51.

The navigation device 10 detects the completion of the repair of the vehicle based on the information from the service tool when the service tool is coupled with the navigation device 10 at the time when the vehicle is repaired. Thus, the device 10 can detect the completion of the repair with high accuracy and easily.

Further, the device 10 prevents the communication device 20 from transmitting the information to the server 51 while the dealer repairs the vehicle, since the device 10 turns on the upload mask function during the repair.

The navigation device 10 provides an failure determination apparatus (anomaly determination apparatus), the computer 11 executing Step S101 provides a notification element, the computer 11 executing Step S104 provides a repair start detection element, the computer 11 executing Step S106 provides a repair completion detection element, and the computer 11 executing Step S108 provides a short-cut element.

MODIFICATIONS

In the embodiment, the predetermined period for detecting the actual failure occurrence is set to be 8 seconds. Alternatively, the failure occurrence detection period may be different from 8 seconds. Although the predetermined period for detecting failure resolution is set to be 10 trips, the failure resolution detection period may be different from 10 trips.

Although the anomaly detector is the navigation device 10, the anomaly detector may be other in-vehicle device. Although the anomaly in the embodiment means malfunction of the vehicle, the anomaly, i.e., the failure may be different from the malfunction. For example, the failure or the anomaly may be shortage of a washer fluid or the like.

The above disclosure has the following aspects.

According to a first aspect of the present disclosure, a failure determination apparatus for a vehicle includes: a failure determination element configured to determine that failure occurs at the vehicle when a state with failure detection continues for a first period, and to determine that the failure is resolved when a state without the failure detection continues for a second period; a notification element configured to notify failure information to an external device when the failure determination element determines that the failure occurs at the vehicle; a repair completion detection element configured to detect completion of repair of the vehicle with respect to the failure; and a short-cut element configured to shorten the second period when the repair completion detection element detects the completion of repair of the vehicle.

In the above device, even if the failure occurs again after the completion of repair with respect to the failure, the apparatus transmits the failure information to the external device since the second period is shortened when the repair completion detection element detects the completion of repair.

Alternatively, the repair completion detection element may detect the completion of repair based on information from a service tool. The service tool is disposed at a repair shop, and coupled with the failure determination apparatus when the vehicle is repaired at the repair shop. In this case, the completion of repair is detected accurately and easily.

Alternatively, the failure determination apparatus may further include: a repair start detection element configured to detect start of repair with respect to the failure. The notification element stops to notify the failure information during a period from a time when the repair start detection element detects the start of repair to a time when the repair completion detection element detects the completion of repair. In this case, the apparatus does not transmit the failure information during the repair.

Further, the first period may be defined by a chronological time, and the second period may be defined by the number of times when an ignition switch of the vehicle is switched from an off-state to an on-state. Furthermore, the failure determination apparatus may further include: a failure detecting element configured to detect the failure in the vehicle and to transmit failure notice to the failure determination element; and a failure resolution counter configured to counts the number of times when the ignition switch is switched from the off-state to the on-state. The failure determination element determines that the failure is resolved when the failure determination element does not receive the failure notice for the second period. Further, the failure determination element is a navigation device, the notification element is a communication device, the failure detecting element is an ECU in the vehicle, and the external device is a server in an information service center.

According to a second aspect of the present disclosure, a computer readable medium comprising instructions being executed by a computer, the instructions including a computer-implemented method for determining failure in a vehicle, the instruction includes: an instruction for determining that failure occurs at the vehicle when a state with failure detection continues for a first period, and for determining that the failure is resolved when a state without the failure detection continues for a second period; an instruction for notifying failure information to an external device when failure occurrence is determined; an instruction for detecting completion of repair of the vehicle with respect to the failure; and an instruction for shortening the second period when the completion of repair is detected.

In the above instructions, even if the failure occurs again after the completion of repair with respect to the failure, the failure information is transmitted to the external device since the second period is shortened when the completion of repair is detected.

According to a third aspect of the present disclosure, a method for determining failure in a vehicle includes: determining that failure occurs at the vehicle when a state with failure detection continues for a first period, and determining that the failure is resolved when a state without the failure detection continues for a second period; notifying failure information to an external device when failure occurrence is determined; detecting completion of repair of the vehicle with respect to the failure; and shortening the second period when the completion of repair is detected.

In the above method, even if the failure occurs again after the completion of repair with respect to the failure, the failure information is transmitted to the external device since the second period is shortened when the completion of repair is detected.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A failure determination apparatus for determining that failure occurs at a vehicle when a state with failure detection continues for a predetermined failure occurrence determination period under a condition that it is determined that the failure does not occur, and for determining that the failure is resolved when a state without the failure detection continues for a predetermined failure resolution determination period after the apparatus determines that the failure occurs, the apparatus comprising:

a notification device configured to notify failure information to an external device when it is determined that failure occurs at a vehicle;

a completion detection device configured to detect completion of repair of the vehicle with respect to the failure; and a short-cut device configured to shorten the predetermined failure resolution determination period when the completion detection device detects the completion of repair of the vehicle.

2. The failure determination apparatus according to claim 1, wherein:

the completion detection device detects the completion of repair based on information from a service tool, which is coupled with the failure determination apparatus when the vehicle is repaired.

3. The failure determination apparatus according to claim 2, further comprising:

a start detection device configured to detect start of repair with respect to the failure, wherein the notification device stops notifying the failure information during a period from a time when the start detection device detects the start of repair to a time when the completion detection device detects the completion of repair.

4. A failure determination program for functioning a computer as a failure determination apparatus, which determines that failure occurs at a vehicle when a state with failure detection continues for a predetermined failure occurrence determination period under a condition that it is determined that the failure does not occur, and determines that the failure is resolved when a state without the failure detection continues for a predetermined failure resolution determination period after the apparatus determines that the failure occurs, the failure determination program functioning the computer as:

a notification device configured to notify failure information to an external device when it is determined that failure occurs at the vehicle;

a completion detection device configured to detect completion of repair of the vehicle with respect to the failure; and a short-cut device configured to shorten the predetermined failure resolution determination period when the completion detection device detects the completion of repair of the vehicle.

5. A failure determination method for determining that failure occurs at a vehicle when a state with failure detection continues for a predetermined failure occurrence determination period under a condition that it is determined that the failure does not occur, and for determining that the failure is resolved when a state without the failure detection continues for a predetermined failure resolution determination period after it is determined that the failure occurs, the failure determination method comprising:

shortening using a short-cut device the predetermined failure resolution determination period when the completion of repair of the vehicle with respect to the failure is detected.

* * * * *